United States Patent
Frank

(10) Patent No.: US 9,062,661 B2
(45) Date of Patent: Jun. 23, 2015

(54) ASSEMBLY AS BEARING ARRANGEMENT FOR THE ROTATIONAL MOUNTING OF MACHINE AND PLANT PARTS

(75) Inventor: Hubertus Frank, Höchstadt (DE)

(73) Assignee: IMO Holding GmbH, Gremsdorf (DE)

( * ) Notice: Subject to any disclaimer, the term of this patent is extended or adjusted under 35 U.S.C. 154(b) by 0 days.

(21) Appl. No.: 13/988,120

(22) PCT Filed: Nov. 1, 2011

(86) PCT No.: PCT/EP2011/069179
§ 371 (c)(1),
(2), (4) Date: Sep. 3, 2013

(87) PCT Pub. No.: WO2012/065840
PCT Pub. Date: May 24, 2012

(65) Prior Publication Data
US 2013/0343688 A1    Dec. 26, 2013

(30) Foreign Application Priority Data
Nov. 17, 2010   (DE) .......................... 10 2010 052 117

(51) Int. Cl.
*F16C 19/54*   (2006.01)
*F03D 11/00*   (2006.01)
*F16C 19/38*   (2006.01)

(52) U.S. Cl.
CPC .......... *F03D 11/0008* (2013.01); *F16C 19/381* (2013.01); *F16C 2300/14* (2013.01)

(58) Field of Classification Search
CPC ...... F16C 19/38; F16C 19/381; F16C 19/383; F16C 19/545; F16C 2300/14; Y02E 10/722
USPC .......... 384/452, 455, 618, 619, 622; 416/174
See application file for complete search history.

(56) References Cited

U.S. PATENT DOCUMENTS

| | | | | |
|---|---|---|---|---|
| 3,652,141 A | * | 3/1972 | Husten et al. | 384/455 |
| 4,906,113 A | * | 3/1990 | Sague | 384/618 |
| 2010/0215307 A1 | * | 8/2010 | Loeschner et al. | 384/571 |
| 2010/0227749 A1 | * | 9/2010 | Uranishi | 492/1 |

FOREIGN PATENT DOCUMENTS

| | | |
|---|---|---|
| DE | 20314660 | 1/2004 |
| DE | 102007019482 | 11/2008 |
| DE | 102008046218 | 3/2010 |
| DE | 102008046624 | 3/2010 |
| EP | 1677005 | 7/2006 |
| EP | 2172665 | 4/2010 |

* cited by examiner

*Primary Examiner* — Phillip A Johnson
(74) *Attorney, Agent, or Firm* — Pandiscio & Pandiscio

(57) ABSTRACT

A bearing arrangement for rotational mounting of machine and plant components, comprising a nose ring, a bearing ring and a retaining ring of a large rolling bearing serving as a main mounting of a rotor of a wind power installation, and further comprising a plurality of tapered-roller rolling bearing arrays, particularly at least two tapered-roller rolling element arrays, which roll circulatingly about a main axis of rotation about the axial direction, and further comprising at least one cylindrical roller array arranged perpendicularly to the tapered-roller rolling element arrays and operative to support radial force components, wherein the plurality of tapered-roller rolling bearing arrays for supporting all axial force components are arranged parallel to one another, and planes of the tapered-roller rolling element arrays in which the tapered-roller rolling element arrays rotate about the axial main axis upon rotational movement of the mounted part do not intersect.

18 Claims, 3 Drawing Sheets

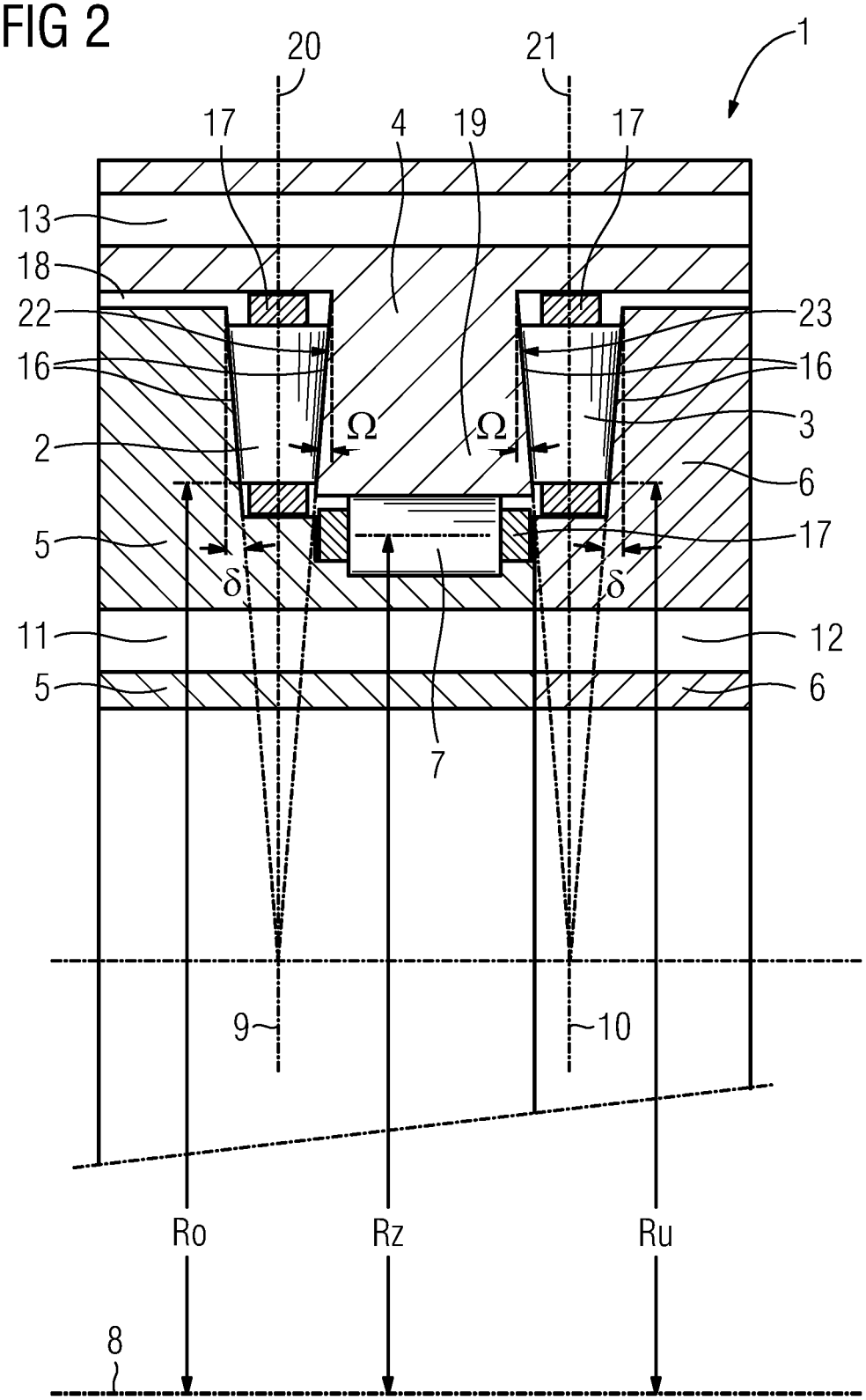

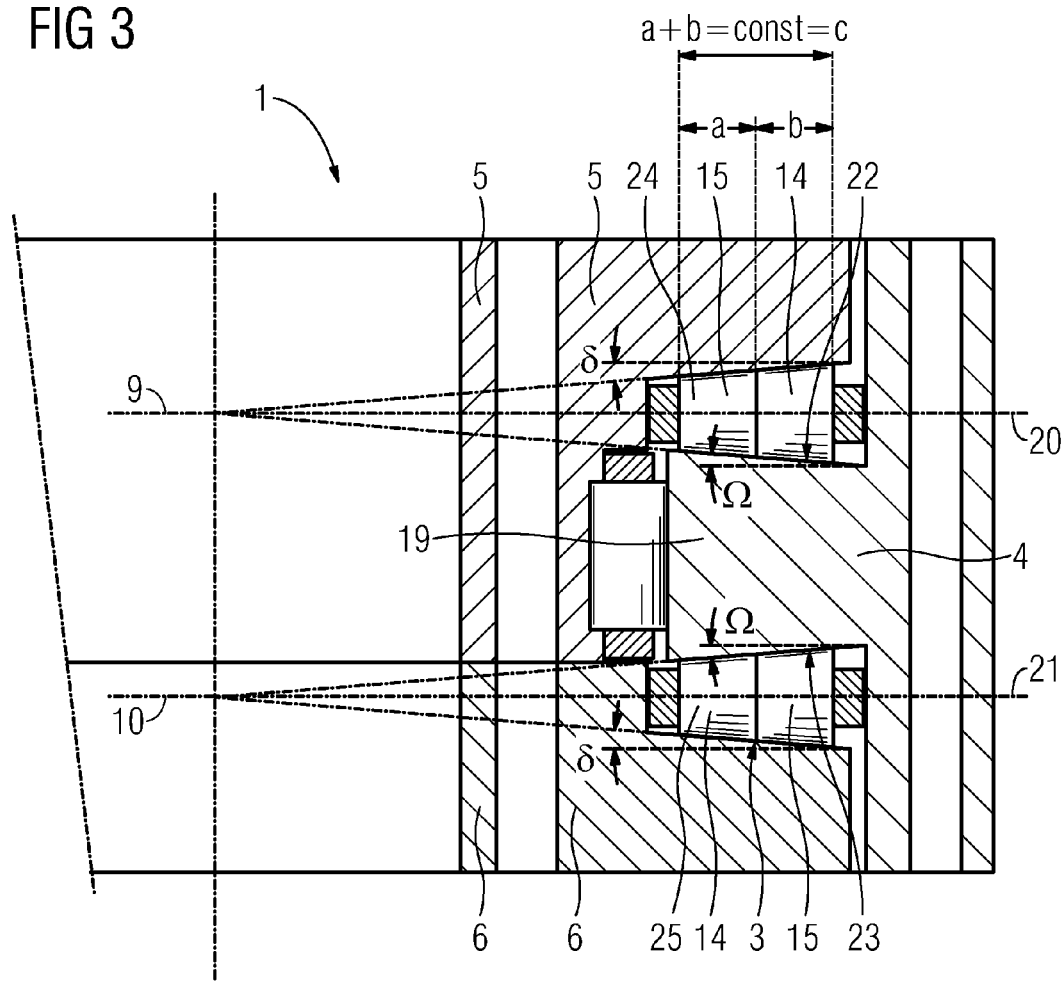

ASSEMBLY AS BEARING ARRANGEMENT FOR THE ROTATIONAL MOUNTING OF MACHINE AND PLANT PARTS

BACKGROUND OF THE INVENTION

1. Field of the Invention

The invention is directed to a bearing arrangement, particularly a multi-row large rolling bearing, for use in wind power installations, and a large rolling bearing for the mounting of components such as a wind turbine rotor or a crane.

2. Description of the Prior Art

The main bearings currently in use for wind power installations are, in many cases, roller bearing slewing rings. Many current wind power installations particularly use three-row roller bearing slewing rings—usually without teeth, although toothed main bearings are also employed in special installations, for example special gearless installations. Multi-row roller bearing slewing rings have come to dominate as the main bearings for wind turbines. The multi-row design is chosen in particular for its ability to absorb axial and radial forces of the kind usually encountered by the main bearing arrangement of a wind turbine.

Thus, DE 10 2007 019 482 A1, for example, describes a multi-row large rolling bearing, particularly an axial/radial bearing for use as the main bearing arrangement of the rotor shaft of a wind power installation (abbreviated WPI), essentially consisting of a vertically arranged, annularly shaped outer disk, an inner ring arranged coaxially with this outer disk, and two annularly shaped shaft disks arranged axially one on each side of and adjacent to the outer disk, wherein at least one row of rolling elements, maintained at an even spacing by a respective bearing cage, rolls between each of the two shaft disks and the outer disk, thus forming a first and a second rolling bearing for absorbing axial forces, while at least one additional row of rolling elements, optionally maintained at an even spacing by an additional cage, is arranged between the outer disk and the inner ring and forms a third rolling bearing for absorbing radial forces, characterized in that the two rolling bearings for absorbing axial forces are formed by two tapered roller bearings whose rolling elements, configured as tapered rollers, are oriented with their respective smaller front faces directed toward the longitudinal axis of the bearing.

The technical document DE 203 14 660 U1 also advances a rotor bearing/main bearing for the mounting of a rotor, in which cylindrical rollers in particular, but also possibly tapered rollers, can be used as rolling elements.

Finally, Patent Application DE 10 2008 046 218 A1 describes a radial rolling bearing comprising an inner ring arrangement that carries an inner raceway, an outer ring arrangement that carries an outer raceway, a row of rollers arranged so as to be able to roll between the inner raceway and the outer raceway, each roller rotating about a roller rotation axis, characterized by a row of balls, wherein each individual ball is configured to be supported at an inner contact point of the inner ring arrangement, an outer contact point of the outer ring arrangement, and a roller contact point on one of the rollers.

SUMMARY OF THE INVENTION

An object underlying the invention is to provide a system that makes use of the advantages of using tapered rollers in multi-row main bearings for wind power installations, and that succeeds in eliminating, or at least reducing, the disadvantages of uneven load distribution.

The present invention utilizes the advantages of the centering action attendant on the use of tapered rollers in main bearings of wind power installations, combined with the advantages gained from an axial mounting arrangement with more than one point of support.

The disadvantageous problems of the conventional prior art can be solved, in particular, if an assembly according to the invention is present that contains a first tapered-roller rolling element array and a second tapered-roller rolling element array, which are located one above the other, and are implemented in parallel one above the other. The rotary action consists in rotation about a main axis, which, according to the invention, can be a rotor of a wind power installation.

In embodiments according to the invention, a nose ring is arranged centrally and its nose is surrounded and supported by at least one support ring and at least one retaining ring, particularly by exactly one support ring and exactly one retaining ring. As proposed above, the load-carrying is done by tapered-roller rolling element arrays. These tapered-roller rolling bearing arrays serve to absorb and support all axial force components. These tapered-roller rolling bearing arrays are arranged parallel to each other according to the invention. This means that the planes of all the tapered-roller rolling element arrays in which these tapered rolling element arrays rotate during rotational movement about the axial main axis, for instance the main shaft of the turning rotor of a wind power installation, do not intersect in practice, that is, within technically relevant distances and/or tolerances.

By virtue of this essential feature of the assembly according to the invention, the intersection points of the planes of rotation of the tapered-roller rolling element array do not coincide at one point, even in the region of the center of the bearing arrangement as a whole, which is defined by the main axis. This has the consequence that more uniform rolling is achieved in a plurality of parallel horizontal planes of the tapered-roller rolling element arrays when the tapered-roller rolling element arrays rotate about the main axis of rotation during the operation of the assembly. From a geometric standpoint, this results in various locations at which these axes, or horizontal planes, intersect with the main axis of rotation.

In this arrangement, at least one upper tapered-roller rolling element array is disposed between the at least one nose ring and the at least one support ring, and thus absorbs the axial forces that are to be transmitted between the nose ring and the support ring.

The plane in which this upper tapered-roller rolling element array rotates about the main axis is therefore perpendicular to the main axis, for example the rotor axis.

At least one lower tapered-roller rolling element array is therefore disposed between the at least one nose ring and the at least one retaining ring and thus absorbs the axial forces that are to be transmitted between the nose ring and the retaining ring. The plane in which this lower tapered-roller rolling element array rotates about the main axis is therefore also perpendicular to the main axis, for example the rotor axis, of rotation.

The embodiment of the invention can be particularly advantageous if more than one type of tapered rolling element is present in a first tapered-roller rolling element array and in the additional tapered-roller rolling element arrays. The distances, or heights, of these tapered rolling elements can be the same. It is also feasible, of course, to use only one type of rolling element per tapered-roller rolling element array, as is commonly known practice.

The distances, which likewise constitute the height of the individual types of rolling elements in a tapered-roller rolling element array, can be different. The overall size, however— i.e., the overall height of a tapered-roller rolling element array—is always the same, i.e., constant. In a particular embodiment of the invention, this overall height is composed of a plurality of individual types of tapered-roller rolling elements within an element array.

The increase in the rolling element diameter of the particular tapered-roller rolling element array is preferably always constant. This increase is defined by the slope angle. Although these angles are always constant within a tapered-roller rolling element array, i.e., referred to the overall height of a tapered-roller rolling element array, they can have different values at the top or bottom of such a tapered-roller rolling element array. This provides the advantage, according to the invention, that a certain contact pressure of the nose ring against the support ring or the retaining ring can be designed in by means of this slope angle.

All the tapered-roller rolling element arrays of the assembly preferably have exactly the same shapes and dimensions. Hence, the dimensions and angles of the at least one upper tapered-roller rolling element array have the same values as the dimensions and angles of the at least one lower tapered-roller rolling element array. The distances of the front faces of the tapered-roller rolling element raceways from the main axis can also be identical.

In a further exemplary embodiment of the invention, these distances of the front faces of the tapered-roller rolling element raceways from the main axis differ from one another.

It is particularly advantageous, according to the teaching of the invention, if there is at least one additional rolling element array perpendicular to the tapered-roller rolling element array, and absorbs all the radial forces occurring between the at least one nose ring and the at least one support ring during the operation, or stoppage, of the assembly. Also present in that case is at least one rolling element array perpendicular to the tapered-roller rolling element arrays and which absorbs all the radial forces occurring between the at least one nose ring and the at least one retaining ring.

This at least one additional rolling element array can be a single cylindrical roller array. This cylindrical roller array can consist of individual cylindrical rollers as rolling elements, or, alternatively, of barrel rollers, or regular spheres, for example, as found in the known design of the four-point ball bearing. A combination of several types of rolling elements is also conceivable in yet another embodiment of the invention, as long as the radial forces that occur are absorbed thereby.

It is particularly provided according to the teaching of the invention that there be various bevels, or oblique planes, along which the aforesaid tapered rollers slide, or on which they roll, during the operation of the assembly according to the invention. These oblique planes can be provided in nose ring(s) and in support ring(s) and retaining ring(s), as the case may be, of the particular mutually corresponding oblique planes.

In practice, these planes or oblique surfaces are usually greased or oiled, or are wetted with a common other lubricant, to enable the retaining ring(s) and the nose ring(s), on the one hand, and the nose ring and the support ring, on the other hand, to rotate relative to one another with the least possible amount of friction. Rolling element cages can be used for better guidance of all, or individual ones, of the rolling elements in their respective raceways. As is customary, the nose ring can in principle be implemented without teeth, or with segmentally arranged teeth, or with teeth in the inner or outer ring.

Particularly important for the use of the assembly, according to the invention, are means of attachment to adjacently disposed and connected structures or devices. In particular, according to the invention, bores in or through which screw-like elements can be guided are introduced into the assembly in order to attach adjacent structures to the assembly, either at support ring(s), or at retaining ring(s), or at nose ring(s).

In an alternative solution to the stated object, the bearing comprises a nose ring and, disposed coaxially with the nose ring and internally, a support ring and a retaining ring, wherein the nose ring comprises, on a side facing radially inward toward a main axis, at least one circumferential formation or nose, wherein at least one first rolling element array comprising conical frustum shaped rolling elements is provided, and at least one second rolling element array comprising cylindrical roller shaped and/or conical frustum shaped rolling elements is provided, wherein one of the rolling element arrays is disposed between the nose ring and the support ring, and the respective other one of the rolling element arrays is disposed between the nose ring and the retaining ring, and wherein each rolling element array rolls on a respective one of the flank surfaces of the formation, or nose, as the rolling elements rotate about their respective center axes, such that the nose ring is movable in rotation relative to the support ring and the retaining ring about a main axis shared in common with the support ring and the retaining ring, and wherein the first and second rolling element arrays are so disposed relative to each other that the center axes of a plurality, preferably all, of the conical frustum shaped rolling elements of the first rolling element array lie in a first rotation plane, and the center axes of a plurality, preferably all, of the cylinder shaped or conical frustum shaped rolling elements of the second rolling element array lie in a second rotation plane, and the first rotation plane and the second rotation plane are aligned parallel to each other.

The inventive structure of the bearing advantageously makes it possible for the axial forces that occur, particularly when the bearing is used to mount a rotor axis of a wind power installation, to be braced against, or diverted, via the rolling elements into a fixedly clamped bearing component. Good absorption and diversion of the axial forces is assured, particularly in the presence of dynamic load changes, caused by gusts, for example. The bearing thus presents higher stability and an even internal load distribution. The term "aligned parallel to each other" should be understood to mean that the rotation planes are parallel, at least within technically relevant distances and/or tolerances.

In a further embodiment of the invention, the circumferential formation, or nose, has an essentially trapezoidal, particularly dovetail-shaped, cross section and/or a cross section that tapers in the radial direction outwardly or away from the main axis, particularly wherein the flank surfaces of the formation, or nose, make at least one angle with a plane perpendicular to the main axis, preferably an angle of 1° in each case, particularly such that the flank surfaces of the formation, or nose, are shaped correspondingly to the conical frustum shape of the conical frustum shaped rolling elements of the first and second rolling element arrays, and/or the rolling surfaces of the support ring and of the retaining ring, such that the first rotation plane and the second rotation plane are aligned parallel to each other.

A formation or nose with a dovetail shaped cross section offers especially stable rolling surfaces for the rolling elements, which can be produced in an advantageous manner. At the same time, a cross section of this kind makes it particularly easy to achieve parallel alignment of the first rotation plane and the second rotation plane. Other trapezoidal shapes are also advantageous, however, depending on the demands imposed on the bearing.

In a further embodiment of the invention, the first and second rolling element arrays comprise substantially identical conical frustum shaped rolling elements, in which an angle ($\delta=\Omega$) is defined that is formed by a jacket surface and a center axis of the particular rolling element, and is preferably equal to 1°.

Symmetrical conical frustum shaped rolling elements with an angle $\delta=\Omega=1°$ have proven particularly advantageous against tilting of the bearing in both directions along the main axis of the bearing, as can occur in the event of wind gusts, for example. In addition, the production of the bearing is simplified if identical rolling elements are used exclusively.

In an alternative embodiment of the invention, the first and second rolling element arrays comprise substantially identical conical frustum shaped, particularly asymmetrical conical frustum shaped, rolling elements, in which at least two angles ($\delta$, $\Omega$) formed by a jacket surface and a center axis of the particular rolling element are defined, particularly differently, particularly in such a way that a bias acts on the first and second rolling element arrays.

In an embodiment of this kind, this slope angle can be used to predefine a contact pressure or a bias of the nose ring against the support ring or the retaining ring.

In a further embodiment of the invention, at least one additional rolling bearing array is disposed substantially perpendicular to the rotation planes of the first and second tapered-roller rolling element arrays and is adapted to support, particularly to absorb and/or redirect, radial force components.

By means of a rolling element array for absorbing and redirecting radial force components, it is possible, for example, to absorb or divert force components resulting from the dead weight of a mounted part, for example of a rotor shaft of a wind power installation.

In a further embodiment of the invention, at least one conical frustum shaped rolling element of the first and/or the second rolling element array is formed of adjacently disposed first and second tapered rolling elements, which in the mounted position form a substantially continuous, two-part conical frustum shaped rolling element, wherein the first tapered rolling element has the same length as the second tapered rolling element or wherein the first tapered rolling element, has a different length from the second tapered rolling element.

The provision of two-part rolling elements simplifies assembly, and if one of the rolling elements becomes damaged, there is no need to replace the entire rolling element, but only the damaged part. It is known, for example, that damage is more likely to occur at the front region of the rolling element, so the front region can be formed by a smaller sub-element, which can then be replaced in the event of damage. This makes it possible to save on material over the life cycle of the bearing.

In a further embodiment of the invention, at least one of the tapered-roller rolling element arrays comprises a rolling element cage, preferably of brass or a brass alloy, which serves to guide the conical frustum shaped rolling elements and which preferably at least partially absorbs and/or redirects radial components of forces acting on the bearing.

A cage made of softer material than the steel of the rolling elements will give way, thus resulting in a kind of sliding friction. A bearing with a cage of this kind will usually have a longer service life, especially in comparison to cageless guidance, e.g. by means of guides incorporated in the ring.

Particularly advantageously, a bearing according to the invention can be used in a wind power installation. The load changes and dynamic loading occurring in such an installation, in particular, can be well absorbed by the bearing according to the invention.

BRIEF DESCRIPTION OF THE DRAWINGS

Further features, characteristics, advantages and effects based on the invention will become apparent from the following descriptions of preferred embodiments of the invention and additional advantageous configurations of the invention, and by reference to the drawings-wherein:

FIG. 2 shows an embodiment according to the invention with a main axis of a part that is to be rotatably mounted;

FIG. 3 shows an embodiment according to the invention with multi-part rolling elements.

DESCRIPTION OF THE PREFERRED EMBODIMENTS

Figure 1:
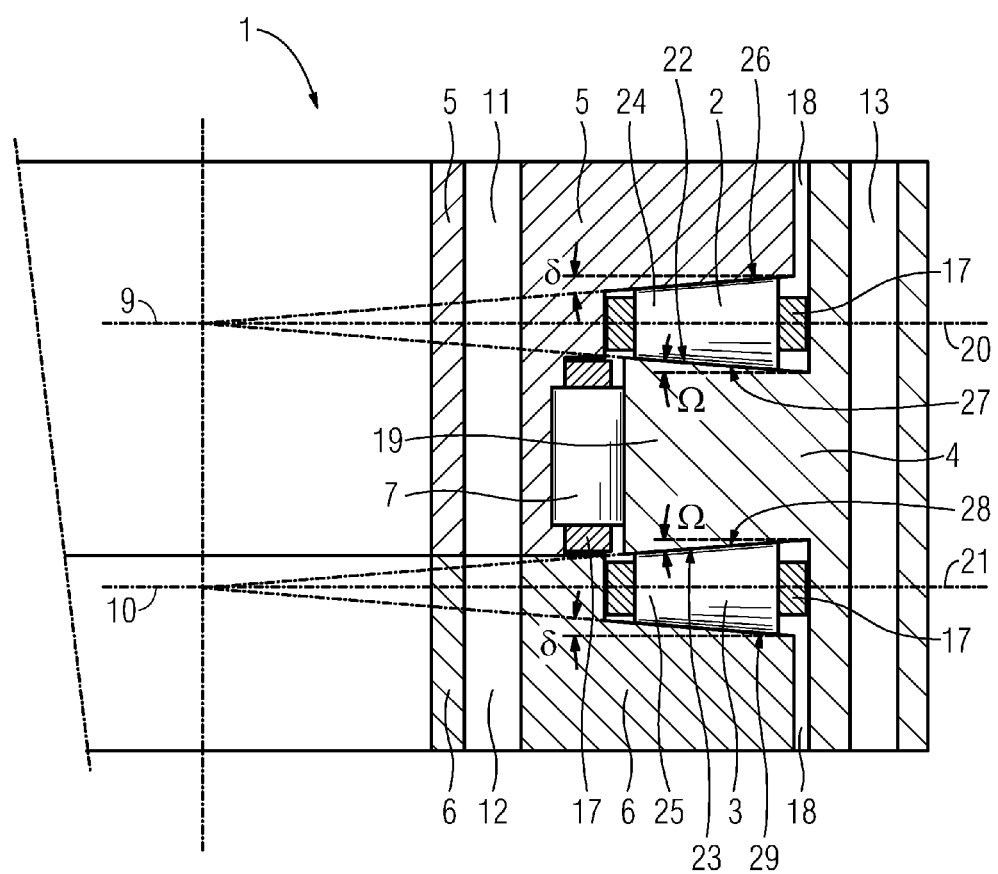
FIG. 1 shows an embodiment according to the invention of a bearing arrangement or a bearing.

FIG. 1 with FIG. 3 show a bearing assembly 1 according to the invention comprising a first tapered-roller rolling element array 2 and a second tapered-roller rolling element array 3, implemented in parallel one above the other. The first and second tapered-roller rolling element arrays 2, 3 each comprise a plurality of conical frustum shaped rolling elements, whose jacket surfaces 26, 27, 28, 29 serve as rolling or rolling-contact surfaces and each of which has a center axis 20, 21 about which the rotational movement of the particular rolling element takes place during operation. The tapered-roller rolling element arrays 2, 3 also each include rolling element cages, for example of brass. The center axes 20, 21 of all the conical frustum shaped rolling elements of the first tapered-roller rolling element array 2 lie in a rotation plane 9 of the first tapered-roller rolling element array 2.

The same applies to the center axes 20, 21 of all the conical frustum shaped rolling elements of the second tapered-roller rolling element array 3: these lie in a rotation plane 10 of the second tapered-roller rolling element array 3.

"Implemented in parallel one above the other" thus means in particular that the rotation planes 9, 10 of the first tapered-roller rolling element array 2 and of the second tapered-roller rolling element array 3 are arranged parallel to each other and do not intersect. Consequently, the center axes 20, 21 of the conically shaped rolling elements of the first tapered-roller rolling element array 2 do not intersect with those of the second tapered-roller rolling element array 3.

In this connection, FIG. 2 clearly shows the main axis 8 of rotation of the mounted part, which according to the invention can be a rotor, or the shaft of a rotor of a wind power installation. The main axis 8 is simultaneously the center axis of the bearing arrangement and coincides with the axis of rotation of the mounted part. Hence, the embodiments described in FIGS. 1 to 3 show, by way of example, the main bearing of a rotor of a wind power/wind energy installation. A nose ring 4 is located in the middle, and its nose 19 is surrounded and supported by a support ring 5 and a retaining ring 6, supported by the aforesaid tapered-roller rolling element arrays 2, 3. In the drawings, the tapered-roller rolling bearing arrays 2, 3 serve to support all axial force components. According to the invention, these tapered-roller rolling bearing arrays 2, 3 are arranged parallel to each other.

That means that the rotation planes 9, 10 of the tapered-roller rolling element arrays 2, 3, in which these tapered rolling element arrays rotate upon rotational movement about the axial main axis 8, do not intersect in practice. Owing to this essential advantage of the assembly 1, the intersection points defined by the planes 9, 10, depicted as visible axes in FIG. 1 with FIG. 3, do not coincide, even in the region of the center of the bearing assembly as a whole, which is defined by the main axis 8.

In a further embodiment (not shown), a bearing can be provided in which, for example, a rolling element array has conical frustum shaped rolling elements in one portion of its circumference and cylindrical roller shaped rolling elements in another portion of its circumference. Such a bearing can be used if, for example, a complete revolution need not be performed, but the bearing instead rotates only through a given angle or segment of a circle. By the choice of various special shapes for the rolling elements, the load-bearing capacity of the bearing can be adapted very precisely to requirements and to the forces that arise.

It is well illustrated in FIG. 1 and FIG. 3 that at the center point of the bearing assembly 1 as a whole, there are various locations at which these axes or planes 9 and 10 intersect with the main axis 8 of rotation. The tapered roller rolling element array 2 is arranged between the nose ring 4 and the support ring 5, and thus absorbs axial forces that are to be transmitted between the nose ring 4 and the support ring 5. The plane 9, in which tapered-roller rolling element array 2 rotates about the main axis 8, is therefore perpendicular to the main axis 8. Tapered-roller rolling element array 3 is arranged between the nose ring 4 and the retaining ring 6, and thus absorbs axial forces that are to be transmitted between the nose ring 4 and the retaining ring 6. The plane 10, in which the tapered-roller rolling element array 3 rotates about the main axis 8, is also perpendicular to the main axis 8 of rotation. The support ring 5 and the retaining ring 6 are configured as two individual rings, which are put together and fixedly connected to each other during the assembly of the assembly 1, after the insertion of tapered-roller rolling element arrays 2, 3 a rolling element array 7, a rolling element cage 17, and the nose ring 4. Tapered-roller rolling element arrays 2, 3 absorb forces, thus resulting in deformation of the rolling elements. Forces acting on, for example, the stationary nose ring 4, which is at least indirectly connected to a foundation of the installation, can likewise be diverted. The nose ring 4 here is the ring of the assembly 1 disposed outwardly in a radial direction and has the circumferential nose 19 at its circumferential region located inward in the radial direction. The nose 19 has a dovetail-shaped cross section, the cross section of the nose 19 tapering in the radial direction outward, i.e., away from the main axis of rotation 8. The nose 19 is provided with flank surfaces 22, 23 on which rolling elements 24, 25 roll.

FIG. 3 shows an exemplary embodiment of the invention in which two different types or kinds of tapered rolling elements 14, 15 are present both in first tapered-roller rolling element array 2 and in second tapered-roller rolling element array 3. "Different types of tapered rolling elements" should be understood to include, in particular, rolling elements having different dimensioning; in the exemplary embodiment shown, the individual tapered rolling elements 14, 15 are cone-shaped, and are so adapted to one another in terms of their dimensioning that in the assembled position, two adjacent tapered rolling elements 14, 15 form a substantially continuous, two-part cone-shaped rolling element. Distances a, b define the height of the tapered rolling element along its axial direction. These distances a, b can be the same. It is also feasible, of course, to use only one type of rolling element per tapered-roller rolling element array 2, 3, as is common known practice. These distances, which likewise constitute the height of the individual types of rolling elements 14, 15 in a tapered-roller rolling element array, can be of different magnitudes. "a" is the height of one type of tapered-roller rolling element 14 in an element array. "b" is the height of a second type of tapered-roller rolling element 15 in an element array. The overall dimension c, however, i.e., the overall height of the tapered-roller rolling element array c=a+b of a tapered-roller rolling element array 2, 3, is always the same, that is, a+b=constant. In a further embodiment of the invention, the overall height c comprises a plurality of individual types of tapered-roller rolling elements within an element array. In this case, as well: a+b+ . . . + . . . + . . . + . . . =constant=c.

According to one exemplary embodiment of the invention, as can be seen, for example, in FIG. 1 with FIG. 3, the increase in the rolling element diameter of a particular tapered-roller rolling element array 2 or 3, denoted in FIG. 3 by angle $\Omega$ and angle $\delta$, is always constant. Angles $\Omega$ and $\delta$ are constant within a tapered-roller rolling element array 2 or 3, respectively, i.e., referred to the dimension c. Angles $\Omega$ and $\delta$ can, however, assume different values in the first tapered-roller rolling element array 2 from those assumed in the second tapered-roller rolling element array 3. The drawings, FIG. 1 with FIG. 3, illustrate an implementation in which the angles are the same: $\delta=\Omega$. An angle of, for example, $\delta=1°=\Omega$ has proven favorable. In another exemplary embodiment of the invention, the slope angles are different from each other, hence $\delta \neq \Omega$.

In one of the illustrated embodiments of the invention according to FIG. 1 with FIG. 3, all tapered-roller rolling element arrays 2, 3 in the assembly 1 are provided with identically the same shapes and dimensions. Hence: the dimensions and angles a2, b2, c2, $\delta 2$, $\Omega 2$ of the one tapered-roller rolling element array, for example tapered-roller rolling element array 2, have the same values as a3, b3, c3, $\delta 3$, $\Omega 3$ of another tapered-roller rolling element array 3. In a further-developed exemplary embodiment of the invention, at least one additional tapered-roller rolling element array with the subscript n, also with the same shapes and dimensions, can be present, so that, then, a2=a3= . . . =an and b2=b3= . . . =bn and c2=c3= . . . =cn and $\delta 2=\delta 3=$ . . . $=\delta n$ and $\Omega 2=\Omega 3=$ . . . $=\Omega n$.

In the example illustrated in FIG. 1 with FIG. 3, distances of the front faces of the tapered-roller rolling element raceways from the main axis 8, i.e., the distance Ro and also the distance Ru, are of identical magnitude upon rotation about the main axis 8. In the example depicted in FIG. 1 with FIG. 3, therefore, Ro=Ru. In another exemplary embodiment of the invention, these distances can differ from one another, hence Ro$\neq$Ru.

In one of the illustrated embodiments of the invention according to FIG. 1 with FIG. 3, there is at least one rolling element array 7, perpendicular to tapered-roller rolling element arrays 2, 3, that absorbs all the radial forces occurring between the nose ring 4 and the support ring 5 during the operation, or stoppage, of the assembly. Also present in that case is at least one rolling element array 7 perpendicular to tapered-roller rolling element arrays 2, 3 that absorbs all the radial forces occurring between the nose ring 4 and the retaining ring 6. In the present exemplary embodiment of the invention, according to the drawing, this is a single cylindrical roller array. According to the drawing, this cylindrical roller array comprises of individual cylindrical rollers as rolling elements. In a further embodiment of the invention, barrel rollers or regular spheres, for example as found in the known design of the four-point ball bearing, can be employed to absorb all the radial forces that arise. A combination of several types of rolling elements is also conceivable, in yet another configuration of the invention, as long as all the radial forces that occur are absorbed thereby.

One of the illustrated embodiments of the invention according to FIG. 1 with FIG. 3 clearly shows, by way of example, various bevels or oblique planes. For example, mutually corresponding oblique planes 16 are present respectively in the nose ring 4, and in the support ring 5, and in the retaining ring 6. The tapered-roller rolling elements of tapered-roller rolling element arrays 2, 3 roll or slide on these planes. In practice, these planes, or oblique surfaces, are usually greased or oiled, or are wetted with a common other lubricant, to enable the retaining ring 6 and the nose ring 4, on the one hand, and the nose ring 4 and the support ring 5, on the other hand, to rotate relative to one another with the least possible amount of friction. Also illustrated according to the invention, by way of example, are the respective rolling element cages 17, which serve to maintain a defined spacing between the rolling elements in a particular rolling element array. The rolling element cages 17 can, for example, be made of brass, which is a softer material than steel, which is the usual material of the rolling elements and the rings of the bearing arrangement. This enables the rolling element cages 17 to absorb radial force components arising, for example, from tilting or certain dynamic load cases of the bearing arrangement. A certain amount of indirect sliding friction between the rolling elements and the bearing rings is permitted in this way. Providing such rolling element cages 17 also eliminates the need for the otherwise customary flanges or guide grooves that are normally incorporated in one of the bearing rings to guide the rolling elements. Such flanges or guide grooves often tend to break off and are therefore a significant cause of failure in bearing arrangements. Relatively soft rolling element cages, and the elimination of flanges or guide grooves, thus increase the operational reliability of such bearing arrangements.

Not illustrated separately and in detail in FIG. 1 with FIG. 3 are obligatory seal assemblies for sealing all the bearing gaps 18 normally found in the assembly 1. All conventional sealing systems for sealing two mutually rotatable components, for example rolling bearings, large rolling bearings, etc., can be used here.

Also not illustrated separately and in detail in FIG. 1 with FIG. 3 are obligatory cooling and heating systems, which can be used routinely to heat or cool bearings, rolling bearings, large rolling bearings, etc.

One of the illustrated embodiments of the invention according to FIG. 1 with FIG. 3 clearly shows bores 11, 12, 13 in which, or through which, screw-like elements can be passed in order to attach adjacent structures to the assembly, either at the support ring 5, or at the retaining ring 6, or at the nose ring 4.

In a further embodiment of the invention, such adjacent structures can also be attached to more than one of the rings 4, 5, 6, either on one side or on both sides, by screw-fastening in bores 11, 12, 13. In another embodiment of the invention, such aforesaid attachment can also be accomplished by welding, by riveting, or by connecting a suitable device to the adjacent structure.

The invention claimed is:

1. A bearing assembly for rotational mounting of a machine or plant component, the assembly comprising a nose ring, a support ring, and a retaining ring, of a rolling bearing serving as a main mounting of a rotor of a wind power installation, and further comprising a plurality of tapered-roller rolling bearing arrays, which roll circulatingly about a main axis of rotation about an axial direction, and further comprising at least one rolling bearing array comprising a cylindrical roller array arranged perpendicularly to said tapered-roller rolling element arrays and operative to support radial force components, wherein the plurality of tapered-roller rolling bearing arrays support all axial force components and are arranged parallel to one another, and planes of said tapered-roller rolling element arrays, in which said tapered rolling element arrays rotate about the axial main axis upon rotational movement of the mounted machine or plant component, do not intersect.

2. The assembly according to claim 1, wherein at least one tapered-roller rolling element array is arranged between said nose ring and said bearing ring.

3. The assembly according to claim 2, wherein the rolling element array perpendicular to the tapered-roller rolling element arrays load-bearingly absorbs all radial forces occurring between the nose ring and the support ring.

4. The assembly according to claim 2, wherein the at least one rolling element array perpendicular to the tapered-roller rolling element arrays absorbs all radial forces occurring between the nose ring and the retaining ring.

5. The assembly according to claim 1, wherein at least one tapered-roller rolling element array is arranged between said nose ring and said retaining ring.

6. The assembly in accordance with claim 1 wherein the nose ring is provided with a selected one or more of outer teeth, inner teeth, and segmentally arranged teeth, or without teeth.

7. The assembly according to claim 1, wherein present in one tapered-roller rolling element array are at least two different types of tapered rolling elements, each rolling element having a continuously increasing, or continuously decreasing, rolling element diameter in a radial direction.

8. The assembly according to claim 7, wherein the increase in the rolling element diameter within a tapered-roller rolling element array is constant.

9. The assembly according to claim 1, wherein all the tapered-roller rolling element arrays in the assembly exhibit identical shapes and dimensions.

10. The assembly according to claim 1, wherein oblique planes, each of which is in direct contact with a respective tapered-roller rolling element array, are present, respectively, in said nose ring and in said support ring and in said retaining ring.

11. The assembly according to claim 1, wherein adjacent structures are adapted to be attached to the assembly, either at said support ring, or at said retaining ring, or at said nose ring, or at more than one of said rings, either on one side or on both sides, by screws.

12. A large rolling bearing for the mounting of components, the bearing comprising a nose ring and, disposed coaxially with the nose ring and internally thereof, a support ring, and a retaining ring, wherein the said nose ring comprises, on a side facing radially inward toward a main axis, at least one circumferential formation or nose, wherein at least one first rolling element array comprising conical frustum shaped rolling elements is provided, and at least one second rolling element array comprising cylindrical roller shaped and/or conical frustum shaped rolling elements, is provided, wherein one of the rolling element arrays is disposed between said nose ring and said support ring and the respective other one of the rolling element arrays is disposed between said nose ring and said retaining ring and wherein each of said rolling element arrays rolls on a respective one of flank surfaces of the formation or nose as said rolling elements rotate about their respective center axes, such that said nose ring is movable in rotation relative to said support ring, and said retaining ring about a main axis shared in common with said support ring and the retaining ring, and wherein the first and the second rolling element arrays are so disposed relative to each other that the center axes, of said conical frustum shaped rolling elements of the first rolling element array lie in a first rotation plane and the center axes of all of said cylinder shaped or conical frustum shaped rolling elements of the second rolling element array lie in a second rotation plane, and the first rotation plane and the second rotation plane are disposed parallel to each other.

13. The bearing according to claim 12, wherein the nose has an essentially trapezoidal or dovetail-shaped cross section and/or a cross section that tapers in the radial direction outwardly or away from the main axis, wherein the flank surfaces of said nose make at least one angle ($\Omega$) with a plane perpendicular to the main axis, such that the flank surfaces of the formation, or nose, are shaped correspondingly to the conical frustum shape of the conical frustum shaped rolling elements of the first and second rolling element arrays and/or the rolling surfaces of said support ring and of said retaining ring, such that the first rotation plane and the second rotation plane are parallel to each other.

14. The bearing according to claim 12, wherein the first and second rolling element arrays comprise substantially identical conical frustum shaped rolling elements, in which an angle ($\delta=\Omega$) is defined that is formed by a jacket surface and a center axis of the particular rolling element and is equal to about 1°.

15. The bearing according to claim 12, wherein the first and second rolling element arrays comprise substantially identical asymmetrical conical frustum shaped, rolling elements, in which at least two angles ($\delta,\Omega$) formed by a jacket surface and a center axis of the respective rolling element are defined differently such that a bias acts on the first and second rolling element arrays.

16. The bearing according to claim 15, wherein at least one additional rolling bearing array is disposed substantially perpendicular to the rotation planes of the first and second rolling element arrays and is adapted to absorb and/or redirect, radial force components.

17. The bearing according to claim 12, wherein at least one of said rolling elements of the first and/or second rolling element array is formed of adjacently disposed first and second tapered rolling elements, which in the mounted position form a substantially continuous, two-part conical frustum shaped rolling element, wherein the first tapered rolling element is provided with the same length as the second tapered rolling element, or wherein the first tapered rolling element is provided with a different length than the second tapered rolling element.

18. The bearing according to claim 17, wherein at least one of the rolling element arrays comprises a rolling element cage of brass or brass alloy, which cage serves to guide the conical frustum shaped rolling elements, and which at least partially absorbs and/or redirects radial components of forces acting on the bearing.

* * * * *